United States Patent [19]

Meisner

[11] Patent Number: 4,925,380
[45] Date of Patent: May 15, 1990

[54] MULTICOLOR CONFECTION EXTRUSION SYSTEM

[75] Inventor: Robert J. Meisner, Hinsdale, Ill.

[73] Assignee: Kraft, Inc., Glenview, Ill.

[21] Appl. No.: 921,224

[22] Filed: Oct. 20, 1986

[51] Int. Cl.⁵ .................. B29C 47/04; A23G 3/04
[52] U.S. Cl. .................. 425/131.1; 264/40.3;
  264/45.9; 264/171; 425/146; 425/382.4;
  425/463; 426/249; 426/516; 426/517
[58] Field of Search .......... 425/131.1, 197, 198,
  425/199, 200, 207, 462, 463, 376 R, 109, 130,
  376.5, 377, 141; 426/249, 516, 517, 518;
  264/45.8, 51, 40.3

[56] References Cited

U.S. PATENT DOCUMENTS

| | | | |
|---|---|---|---|
| 2,586,275 | 2/1952 | Toulmin, Jr. | 264/45.8 |
| 2,766,479 | 10/1956 | Henning | 425/198 |
| 2,847,311 | 8/1958 | Doumak et al. | 426/571 |
| 2,862,241 | 12/1958 | Mattia | 425/145 |
| 3,062,661 | 11/1962 | Doumak | 426/572 |
| 3,220,853 | 11/1965 | Golosinec et al. | 426/250 |
| 3,381,336 | 5/1968 | Wells | 425/378.2 |
| 3,543,348 | 12/1970 | Nussbaum | 425/4 R |
| 3,547,836 | 12/1970 | Brueggemann et al. | 264/51 |
| 3,663,670 | 5/1972 | Swayne et al. | 425/4 R |
| 3,682,659 | 8/1972 | Jurczak et al. | 426/329 |
| 3,687,589 | 8/1972 | Schrenk | 425/131.1 |
| 3,767,338 | 10/1973 | Soderlund et al. | 426/131.1 |
| 3,876,743 | 4/1975 | Soderlund et al. | 264/75 |
| 3,918,865 | 11/1975 | Nissel | 425/131.1 |
| 3,941,544 | 3/1976 | Barth | 425/376 |
| 3,981,951 | 9/1976 | Ridiman | 264/140 |
| 4,120,923 | 10/1978 | Kloker et al. | 264/45.3 |
| 4,349,495 | 9/1982 | Mühle | 264/45.8 |
| 4,395,221 | 7/1983 | Herrington | 425/467 |
| 4,435,141 | 3/1984 | Weisner et al. | 425/131.1 |
| 4,449,906 | 5/1984 | Sienkiewicz et al. | 425/131.1 |
| 4,480,980 | 11/1984 | McFarland et al. | 425/131.1 |
| 4,528,900 | 7/1985 | Simelunas | 99/450.7 |
| 4,533,308 | 8/1985 | Cloeren | 425/131.1 |
| 4,540,537 | 9/1985 | Kamp | 264/171 |
| 4,548,568 | 10/1985 | Herbert et al. | 425/131.1 |
| 4,549,915 | 10/1985 | Ritschel et al. | 156/78 |
| 4,614,489 | 9/1986 | Juravic | 425/376.1 |
| 4,738,861 | 4/1988 | Blair et al. | 426/549 |

FOREIGN PATENT DOCUMENTS

613457  5/1935  Fed. Rep. of Germany ...... 425/197

Primary Examiner—Jay H. Woo
Assistant Examiner—K. P. Nguyen
Attorney, Agent, or Firm—Fitch, Even, Tabin & Flannery

[57] ABSTRACT

Apparatus for manufacturing a multicolored aerated confection product utilizing individually adjustable multi-orifice extrusion systems.

7 Claims, 3 Drawing Sheets

MULTICOLOR CONFECTION EXTRUSION SYSTEM

BACKGROUND OF THE INVENTION

This invention relates to the production of confections, and, more particularly, relates to the manufacture of multicolored marshmallow, nougat and similar aerated confection products.

As described in U.S. Pat. Nos. 2,847,311, 3,062,611, 3,220,853 and 3,607,309, marshmallows and similar confections are conventionally manufactured by extruding a heated, aerated confection blend to form multiple strands. The extruded strands may be coated with starch, powdered sugar or mixtures thereof to prevent sticking of the strands to each other, and cut transversely to their longitudinal axes to form confection products of desired size. By simultaneously extruding multiple strands of different color, flavor, texture and/or cross section prior to cutting of the multiple strands, a colorful and appealing blend of confection pieces, each of a single color, may be continuously manufactured which has substantial consumer appeal as a snack item or as a component of another food product such as a breakfast cereal. It would also be desirable to manufacture individual confection pieces of various shapes which are also multicolored. However, the high speed manufacture of multicolored aerated confection pieces presents difficulties, for example, including problems relating to variation of the rheological properties of the aerated confection blend with composition temperature and gas content. In addition, the tendency for the colors of differently colored confection blends to intermingle, or "bleed" during or after extrusion, or as a result of cross cutting of the extruded strands, also is an impediment to the manufacture of multicolored confection pieces having sharply defined multicolored patterns. Moreover, because of the extrusion properties of the aerated, heated and pressurized confection blend, including its tendency to expand upon extrusion as a function of its aeration gas content, temperature and pressure, substantial difficulties are presented in achieving a final extruded product having the desired placement, shape and cross section of the different colored zones of an extruded product.

Accordingly, an object of this invention is to provide methods for the production of multicolored, aerated confection products. Another object is to provide a novel extrusion apparatus for the high speed production of multicolored confection products, which can be accurately controlled to provide multicolored confection products of uniformly high quality. These and other objects and advantages of this invention will be apparent from the following detailed description and the accompanying drawings.

SUMMARY OF THE INVENTION AND DESCRIPTION OF THE PREFERRED EMBODIMENT

Generally in accordance with the present invention, methods and apparatus are provided for manufacture of multicolored confection products. Such methods and apparatus are particularly adapted for high speed manufacture of individual, multicolored, firm textured aerated confection products.

By "aerated confection product" is meant an aerated form-stable confectionery food product having a density in the range of from about 0.25 to about 0.39 grams per cubic centimeter (from about 35 to about 50 ounces per gallon in the confectioner's terminology) and comprising from about 50 to about 80 percent of a saccharide component and from about 10 to about 16 percent of water, based on the total weight of the aerated confection product. The saccharide component may include monosaccharide and disaccharide sugars such as sucrose, dextrose and fructose, as well as hydrolyzed starch syrups such as corn syrup which include dextrin, maltose and dextrose, and/or invert sugar syrups which include levulose and dextrose. The confection product may include up to about 50 weight percent of flavoring agents such as fruit juices and/or fruit flavors. The confection may further include up to about 2.5 weight percent hydrocolloid components such as pectin, gelatin, albumen and gums and up to about 15 weight percent, of other ingredients such as coloring agents, dairy products, fats, etc., based on the total weight of the confection product, in accordance with conventional practice. In view of the low water content, such aerated confection products may typically have a firm or hard texture, rather than a soft or compliant texture.

In accordance with apparatus aspects of the present invention, multi-orifice compound extrusion apparatus is provided for extruding multicolored aerated confection strands. Such aerated confection extrusion apparatus comprises means for providing a first pressurized, fluid aerated confection blend of a first color at a temperature in the range of from about 115° F. to about 160° F., and preferably at a temperature in the range of from about 125° F. to about 150° F., and at a pressure of at least about 30 psi such as in the range of from about 30 to about 100 psi, and typically from about 30 to about 60 psi. These pressures are determined at the extrusion zones, as will be apparent from the following disclosure. By "color" is meant a confection of any color, including white, which may be provided by the base confection ingredients, and by additional artificial or natural coloring agents.

The apparatus further comprises elongated first diffusion chamber means for receiving the first-colored aerated, pressurized confection blend and for continuously distributing the first-colored blend along an elongated diffusion chamber zone. In this regard, the elongated diffusion chamber zone may have a width to length ratio of at least about 10, and preferably at last about 20, where the width represents the longest dimension of the diffusion chamber zone, which may typically be in a direction generally orthogonal to the average direction of flow of the confection blend in diffusion chamber zone, and the length represents the largest dimension of the zone in a direction orthogonal to the length dimension within the zone. In order to extrude the confection blend, the apparatus further includes elongated first extrusion chamber means for receiving the first-colored confection blend from the first diffusion chamber means and for continuously discharging the first-colored confection blend through a plurality of at least about 10, and preferably at least about 30 separate extrusion ports. Positioned between the first diffusion chamber means and the first extrusion chamber means is a first elongated diffusion means for equalizing the pressure distribution of the first colored confection blend along the length of the first extrusion chamber means in comparison to the pressure distribution of the blend along the length of the first diffusion chamber means. The first-colored confection blend is discharged from the first diffusion chamber means through the elongated diffusion means into the first extrusion chamber means. The first elongated diffusion means may desirably be an elongated sheet having a plurality of passageways (or a passageway of varying width) therethrough, the cross-sectional area of the respective passageways being an inverse function of the pressure of the confection blend in the first diffusion chamber zone adjacent the respective passageway. In this regard, relatively smaller passageways are provided adjacent zones of higher pressure, while relatively larger passageways are provided adjacent zones of lower pressure, to equalize the dynamic pressure distribution of the confection blend in the extrusion chamber.

The aerated confection extrusion apparatus further comprises means for providing a second pressurized, fluid, aerated confection mix of a second-color at a temperature in the range of from about 115° F. to about 160° F., and preferably at a temperature in the range of from about 125° F. to about 150° F., and at a pressure (similarly determined at the extrusion zones) in the range of at least about 30 psi such as in the range of from about 30 to about 100 psi, and preferably from about 60 to about 70 psi. By "second-colored" is meant any color, including white, which is visibly different from the first-colored confection blend.

In order to provide multicolored confection products, the apparatus further comprises elongated second diffusion chamber means for receiving the second-colored aerated, pressurized confection blend and distributing the second-colored blend received therein along an elongated diffusion chamber zone. In this regard, the elongated diffusion chamber zone may similarly have a width to length ratio of at least about 10, and preferably at last about 20, where the width represents the longest dimension of the diffusion chamber zone, which may typically be in a direction generally orthogonal to the average direction of flow of the confection blend in diffusion chamber zone, and the length represents the largest dimension of the zone in a direction orthogonal to the length dimension within the zone. The apparatus further includes elongated second extrusion chamber means for receiving the second-colored confection blend from the second diffusion chamber means and for continuously discharging the second-colored confection blend through the same plurality of at least about 10, and preferably at least about 30 separate extrusion ports. Positioned between the second diffusion chamber means and the second extrusion chamber means is a second elongated diffusion means for equalizing the pressure distribution of the second colored confection mix along the length of the second extrusion chamber means in comparison to the pressure distribution of the mix along the length of the second diffusion chamber means. The second colored confection blend is discharged from the second diffusion chamber means through the elongated diffusion means into the second extrusion chamber means. The elongated diffusion means may similarly be an elongated sheet having a variable width passageway or a plurality of passageways therethrough, the cross-sectional area of the respective passageway(s) being an inverse function of the pressure of the confection blend in the second diffusion chamber zone adjacent the respective passageway. The second extrusion chamber means, which receives the pressurized second-colored confection mix from the second diffusion chamber means via the diffuser plate means, functions to discharge the second-colored confection blend through the same plurality of at least about 10 and preferably about 30 separate extrusion ports through which the first confection mix is discharged by the first extrusion chamber means.

The aerated confection extrusion apparatus further includes a plurality of compound extrusion nozzle means each positioned adjacent to one of said separate extrusion ports for receiving the first-colored confection blend discharged through said port from said first extrusion chamber means for receiving said second-colored confection blend from said second extrusion chamber means, and for combining and forming said first-colored stream and said second-colored stream from each respective one of said extrusion ports into a single, multi-colored strand of predetermined cross-sectional shape without substantial blending of said first-colored and said second-colored stream. In addition, the apparatus comprises first-colored extrusion port valve means for individually adjusting the rate of flow of the first-colored aerated confection through each individual port, and second-colored extrusion port valve means for individually adjusting the rate of flow of said second-colored aerated, confection product from said second extrusion chamber through each of said individual extrusion ports.

Also in accordance with the present invention, methods for producing multicolored, aerated confection products are also provided in which a confection blend is prepared by blending appropriate confection ingredients such as previously described, and heating through a series of steps, the confection blend to a processing temperature of at least about 115° F., typically about 140° F. Further in accordance with such methods, the heated confection blend is continuously aerated at a pressure of at least about 50 psi (e.g., 50-400 psi) and preferably in the range of from about 200 to about 1350 psi to provide an aerated confection blend stream having a density in the range of from about 0.27 to about 0.39 grams per cubic centimeter (from about 35 to about 50 ounces/gallon) and preferably in the range of from about 38 to about 44 ounces per gallon at atmospheric pressure and ambient temperature. The pressure after aeration may be reduced prior to extrusion of the aerated confection, to a range of, for example, 30 to 100 psi. Such methods further include the steps of dividing the aerated confection stream into a plurality of aerated confection streams, introducing and mixing throughout at least one of the plurality of streams a coloring agent to provide a plurality of at least two differently colored aerated confection streams having substantially identical rheological properties. A first one of said plurality of differently colored aerated confection product streams is then separated into a plurality of at least about 10, and preferably at least about 30 individual extrusion streams, and at least a second one of the plurality of differently colored streams is separated into a second plurality of at least about 10, and preferably at least about 30 individual extrusion streams. Individual first streams and individual second streams are combined in a predetermined pattern without mixing and forced through a common orifice to provide multicolored strands of predetermined cross section without substantial intermingling of the differently colored streams in the multicolored strands. Also in accordance with such methods, the flow rate of at least one of the respective individual streams is adjusted to control the cross-sectional shape of each of said differently colored streams in at least one of the multicolored strands. Preferably, the flow rate of each differently colored stream of each multicolored strand may be individually adjusted to provide a desired, uniform cross sectional shape. The multicolored strands are subsequently severed without substantially intermingling the differently colored zones of the strands to produce multicolored confection products.

Various aspects of the present invention will now be described with reference to the specific embodiment of a confection manufacture system embodiment illustrated in FIG. 1 of the drawings, and the particular embodiment of composite confection extrusion apparatus illustrated in FIGS. 2 through 9.

Figure 1:
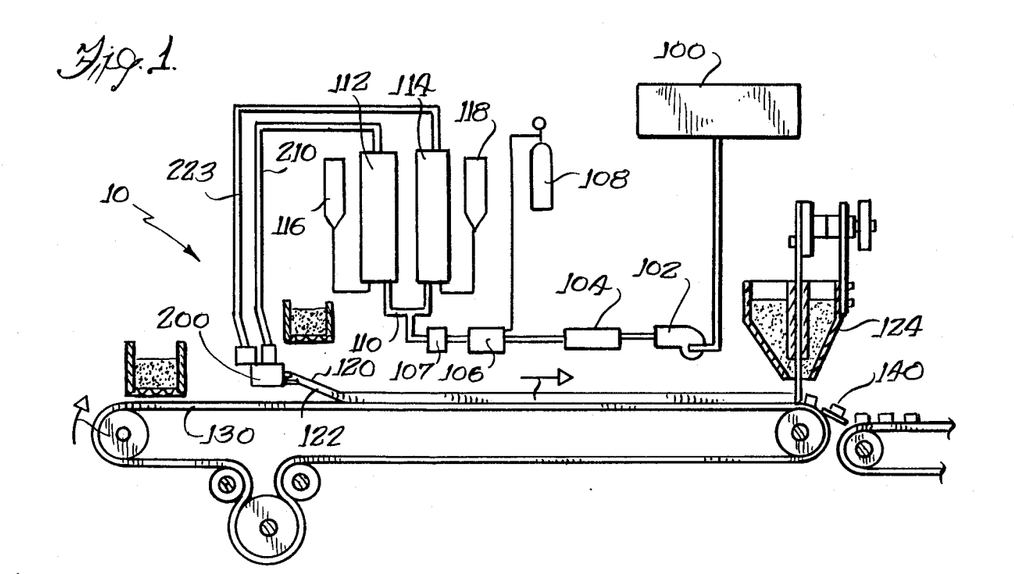
FIG. 1 is a schematic illustration of apparatus for the manufacture of multicolored confection products in accordance with the present invention.

In the multicolored aerated confection manufacturing system 10 schematically illustrated in FIG. 1, confection components are combined, blended and heated in a confection tank 100 to provide a fluid confection mix which is continuously pumped under pressure.

The illustrated system 10 comprises a conventional confection mix tank 100, pump 102, temperature and pressure control apparatus 104 and aerator 106 with appropriate pressurized gas source 108, and is cooled in heat exchanger 107 to an appropriate temperature in the range of from about 120° F. to about 135° F. A manifold 110 divides the aerator output into a plurality of product streams respectively directed to a corresponding plurality of static in-line mixers 112, 114 each having a separate coloring agent source 116, 118 associated therewith. Separate, differently colored confection streams from the plurality of mixers 112, 114 are directed under pressure to compound confection extrusion apparatus 200, which is illustrated in more detail in FIGS. 2–9. The compound multiple orifice confection extrusion apparatus 200 forms multiple strands 120, 122 of individually multicolored aerated confection, which are transported by conveyor assembly 130 to a transverse cutter 124 in accordance with conventional practice. A plurality of dispensers 126, 128 for powdered starch or similar material are provided to prevent strand adherence to processing equipment and other strands.

A confection blend may be prepared by blending appropriate confection ingredients, which may comprise a monosaccharide, such as dextrose, a disaccharide, such as sucrose and a gelatin. A gelatin may be selected which has desired properties prior to substantial gelling, but a set condition may be effected by the use of a starch or a product having starch-like characteristics. In general, starches of corn, potato, sago, tapioca or waxy maize are preferred as confection components.

The confection blend may contain substantially the amount of moisture in the desired end product. In this regard, the moisture content of the confection blend prepared for the specific embodiment of FIG. 1 may generally be below 19 weight percent and is preferably in the range of from about 10 to about 16 weight percent, based on the total weight of the blend. This provides a firm, relatively hard, aerated confection product.

In accordance with conventional practice, the gelatin may desirably provide increased whipping properties to the confection blend, and may have a Bloom strength of less than about 300. The viscosity of the gelatin is desirably below about 70 millipoise when using 6 ⅔ percent aqueous solution at 60° C. and a standard viscosity pipette.

In the specific embodiment of FIG. 1, sufficient gas is introduced at an operating pressure in the range of 200 to 350 psi to provide a finished confection product, after expansion, having a density in the range of from about 0.27 grams per cubic centimeter to about 0.39 grams per cubic centimeter. The density of the whipped confection blend prior to extrusion is a function of the processing pressure, which may desirably vary from about 30 to about 100 psi at the zones of extrusion, and preferably from about 60 to about 80 psi, and to a lesser extent, the processing temperature.

Due to the relatively low water content of the confection blend and the incorporation of air into the blend, a very stiff, firm aerated confection blend is obtained for subsequent extrusion according to the invention in the form of continuous strands, as will be explained more fully hereinafter. The rheological properties of the aerated blend, however, may vary with relatively small variation in temperature, ingredients (particularly including sugar and water content), amount and size of distribution of aeration gas content and pressure.

The aerated mix is forced through manifold 110 which divides the aerated mix into multiple product streams for blending therewith different coloring agents and/or flavoring agents to provide multiple streams of similar consistency and rheological properties but differing visual appearance. The flow of mix through to the manifold may be impeded by a pressure regulating valve to maintain the desired working pressure within the aerator.

The aerated, differently colored confection mixes which are produced by the respective static mixers 112, 114 are then delivered under pressure to the corresponding inlets of the compound, multiple orifice confection extruder apparatus 200. The compound, multiple orifice confection extruder apparatus 200 is an important aspect of the system 10 and will be described in more detail hereinafter. The extruder 200 forms the differently colored confection blends into an upper plurality of continuous, parallel, multicolored strands 120 and a similar lower plurality of continuous, parallel multicolored strands 122 which are received on a traveling belt 130.

The whipped confection blend is discharged from the extrusion orifices of the compound extrusion head at a temperature which is generally in the range of from about 120° F. to about 135° F. At higher temperatures, i.e., above 135° F., the product tends to slump after discharge, while at temperatures below about 120° F., power requirements may become excessive and satisfactory cutting or severing of the product may be difficult. It will be understood, however, that some variations from this temperature range may be effected in the event of unusual whipped confection formulations.

The extruded, whipped confection strands may be cut transversely after a short period of quiescence which may be in the range of from about 25 to about 240 seconds. The length of this quiescent time period may be varied as a function of the speed of the belt 130, and the distance between the extrusion orifices and the cutting station. Prior to cutting or severing, and therefore prior to substantial gelling, the product is substantially uniformly coated with an anti-sticking agent such as powdered starch or a powdered, starch-sugar mixture to facilitate cutting and also to provide a desired surface condition which prevents sticking of the product strands, or the severed product pieces to each other.

The strands may be cut transversely in any suitable manner, such as by a rapidly reciprocating knife coated with starch in accordance with conventional practice. However, appropriate procedures should be employed to prevent the transverse cutting operation from "smearing" one or more of the colors along the cut faces of the finished confection product. In this regard, a sufficient time should be provided between the time of extrusion and the time of cutting to at least partially solidify the differently colored aerated confection zones. In addition, it may be desirable to orient the confection strands so that the number of differently colored zones which the various portions of the knife transverses is minimized along the knife length. In this regard, it will be appreciated that the differently colored strands in the illustrated embodiment 10 are oriented such that the differently colored zones are disposed substantially horizontally, such that a vertically descending knife will not smear the color of one zone along the face of another differently colored zone. Complete severance of the strands by the knife is not required, with subsequent working or tumbling after partial cutting also being effective to fully sever the cut strand pieces. In this regard, the severed pieces may be tumbled, or worked in accordance with conventional practice to provide a uniformly shaped product free from distortion, tails and sticking.

In the illustrated embodiment 10, a plurality of dispensing devices 132, 134 continuously dust powdered starch onto the belt 130 and the advancing strands 120, 122 as they are forced from the extrusion apparatus 200. A cutter unit 124 is positioned at the discharge end of the conveyor belt 130, and may comprise a hopper 132 within which reciprocates an elongated guillotine knife 134 which severs the multiple strands to form individual, multicolored confection pieces 140. It is apparent that the speed of reciprocation of the knife, as compared to the speed of advancement of the belt 130 carrying the multicolored strands to be cut, determines the length of the confection pieces 140. Powdered starch is preferably maintained in the hopper 132; and, with each downward movement of the knife 134, a portion of the starch is carried therewith to coat the cut surfaces of the marshmallows, the starch also functioning as a lubricant to facilitate the cutting operation.

The cut and starch-covered confection pieces are then conveyed to a conventional tumbler and screening device (not shown) which functions to cover all raw surfaces with starch to prevent sticking of the individual pieces during further processing, and to remove excess starch through a screening device. The confection pieces are next cured, preferably by conveying them through a drum (not shown). Depending upon the conditions prevailing, cool air or heated air may be passed through the drum to provide the desired curing atmosphere. The confection pieces are then further dried, if necessary, and thereafter stored for use.

The composite, multicolored aerated confection product produced in accordance with the present methods comprises less than about 19 percent moisture and more than about 10 percent moisture. Suitable flavoring and coloring agents may be utilized, as desired in providing the multicolored composite confections.

Figure 2:
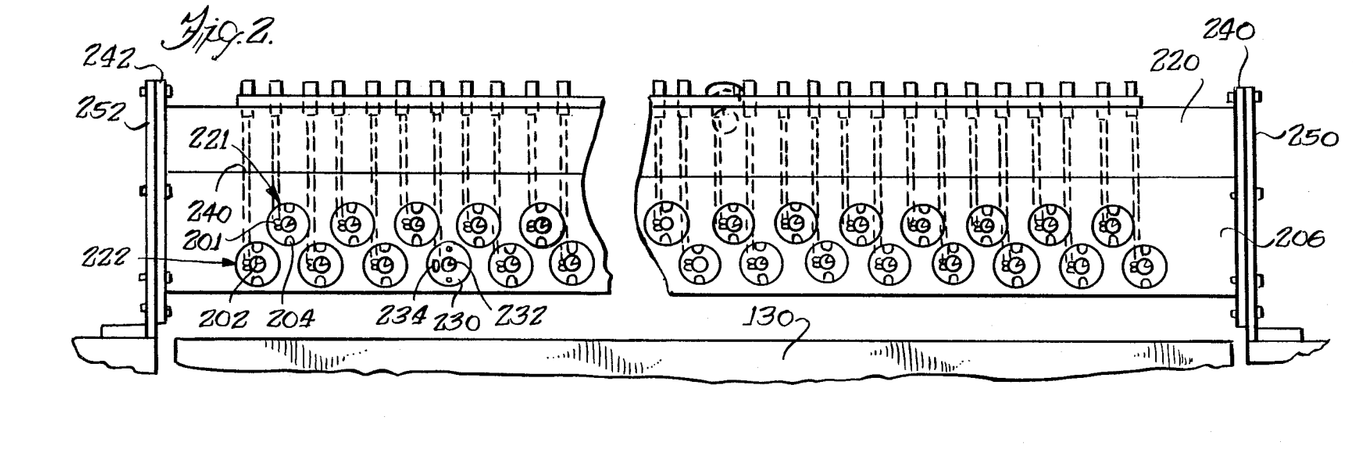
FIG. 2 is a front view of an embodiment of a compound, multi-orifice confection extrusion apparatus for extrusion of multicolored confections which is suitable for use in the system of FIG. 1.
Figures 3, 5:
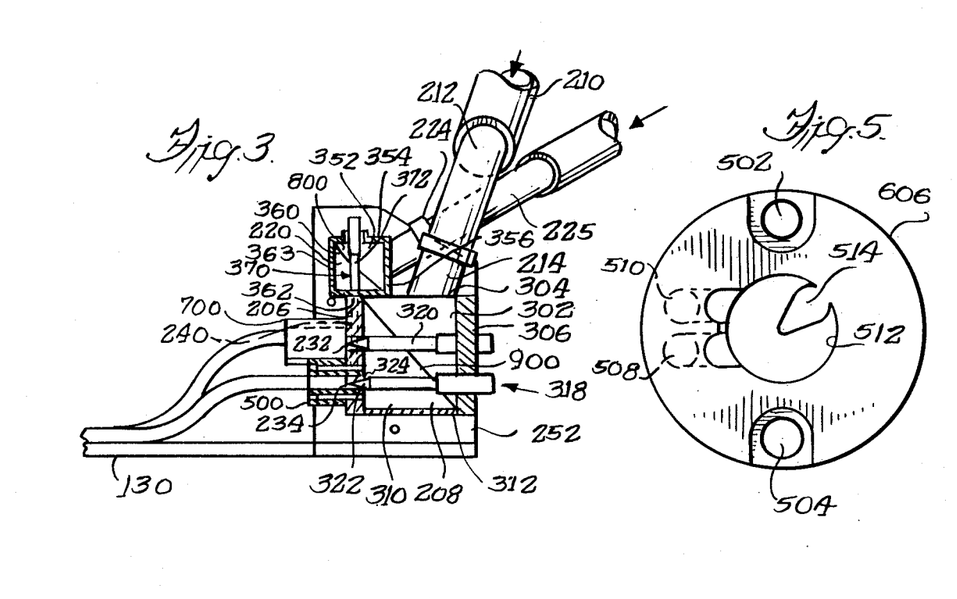
FIG. 3 is an enlarged, cross-sectional side view of the compound confection extruder apparatus of FIG. 4, taken through line 3—3.
FIG. 5 is an enlarged front view of one of the lower compound extrusion nozzles of the multi-orifice extrusion apparatus of FIG. 2.

As indicated, the compound multiple orifice compound extruder apparatus 200 is an important aspect of the confection manufacturing system 10, and is shown in detail in FIGS. 2 through 9. As shown in FIG. 2, which is a front elevation of the compound multiple orifice confection extruder apparatus 200 illustrating the position of certain internal manifold and material transport channels in phantom by dotted line. The compound multiple orifice confection extruder apparatus 200 comprises an upper row 221 of a plurality of compound extrusion ports 201, and a lower row 222 of similar compound extrusion ports 202 arranged in staggered relationship in respect to the extrusion ports of the upper row 221. In the illustrated embodiment, there are 21 upper extrusion ports 201 and 22 lower extrusion ports 202, for a total of 43 ports, any of which may be selectively closed off, or utilized and adjusted for extrusion of a multicolored aerated confection strand. As shown in FIG. 3, which is a cross sectional view of the compound multiple orifice confection extruder apparatus 200 taken through line 3—3 of FIG. 3, the upper row of extrusion ports 201 protrudes from the apparatus 200 a distance which is slightly greater than the protrusion distance of the lower row 222 of ports 202. The extrusion ports 201, 202 are fastened in a suitable manner, such as by means of appropriate bolts 204, to the front face 206 of a first-colored, aerated confection extrusion reservoir 208 (FIG. 3). The first-colored, aerated confection reservoir 208 is supplied with pressurized, aerated confection from static mixer 112 by means of inlet line 210, manifold 212 and two inlet ports 214, 216.

The extruder apparatus is similarly provided with a second-colored, aerated confection extrusion reservoir 220 which is similarly provided with pressurized, aerated, differently colored confection of a second color from static mixer 114 by means of inlet line 223, manifold 225 and two inlet ports 224, 226 which are similarly spaced apart along the second-colored, aerated confection extrusion reservoir. The zones 230 of the front face 206 of the first-colored, aerated confection extrusion reservoir at which the extrusion ports are connected are provided with outlet openings 232 from the first reservoir zone 208, and the second reservoir zone 220, respectively.

The ends of the first-colored confection extrusion reservoir zone 208 and the second-colored extrusion reservoir zone 220 are provided with flanges 240, 242 which are attached to mounting plates 250, 252, which in turn support the compound multiple orifice confection extrusion apparatus 200 at a predetermined position above the product belt 130. The end plates 250, 252 also function to form a hermetic seal at the respective ends of the reservoir zones 208, 220.

Figure 9:
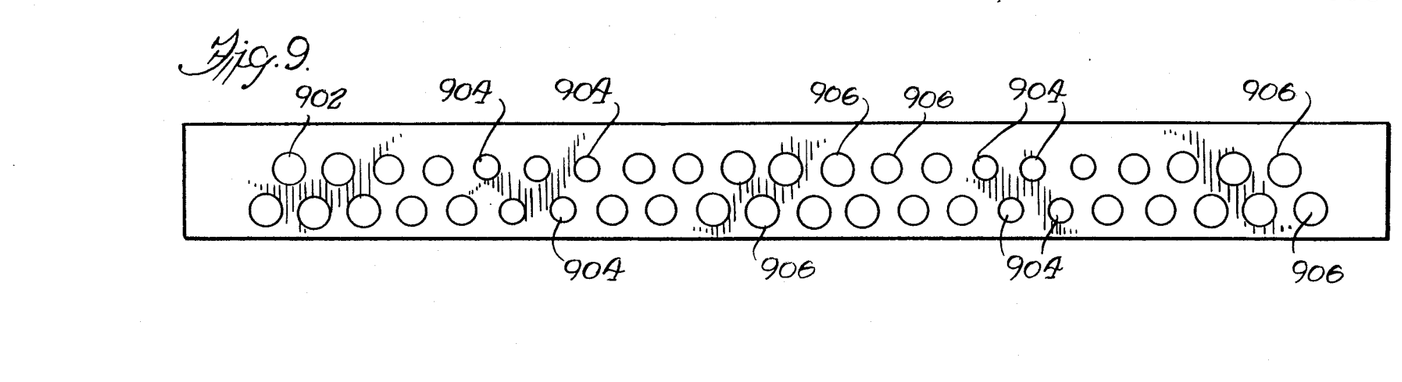
FIG. 9 is a front view of an internal diffusion plate of a second-colored aerated confection chamber of the the multi-orifice compound extrusion apparatus of FIG. 2.

As previously discussed, in accordance with the present invention, an extrusion apparatus is provided having individually adjustable extrusion valves which provide individual fine control of the cross-sectional shape of the respectively different-colored portions of the extruded confection strand. In this regard, turning to FIG. 3, it will be seen that the first reservoir zone 208 comprises an elongated pressurized aerated confection distribution zone 302 defined by upper wall 304, rear support wall 306 and a diffuser plate 900, which is shown in more detail in FIG. 9. As shown in FIG. 9, the diffusion plate 900 is substantially rectangular in shape, and is provided with a plurality of openings 902 at positions corresponding to and centered upon the respective projection of each of the extrusion port attachment zones 230 upon the plate 900. The openings 902 vary in size along the length of the plate 900, with smallest openings 904 at positions immediately adjacent the first-colored confection inlet ports 214, 216, and with the largest openings 906 positioned at locations most distant from the inlet ports 214, 216. The first-colored aerated confection extrusion apparatus further comprises an extrusion port distribution zone 310 similarly extending the length of the compound multiple orifice confection extrusion apparatus 200, which is in turn defined by the distribution plate 900, lower wall 312, and front extrusion face 206.

As shown in FIG. 3, the lower, first-colored confection reservoir 208 is also provided with needle valve assemblies 318 for each of the extrusion openings 232. Each of the needle valve assemblies extends from the front face 206 of the first-colored confection extrusion reservoir 208, through the respective openings of the diffusion plate 900, and in this regard, the diameter of the smallest openings 904 is larger than the outer diameter of valve stems 302 to permit flow of the first-colored pressurized aerated confection blend therethrough from the inlet distribution zone 302 to the extrusion distribution zone 310 in the vicinity of the extrusion outlet opening associated with the respective needle valve assemblies. The needle valve assemblies each extend through and are threaded into the rear support wall 306 of the reservoir, with the outer stationary valve element forming a pressure tight seal therewith. Upon rotational adjustment of the needle valve assemblies, its conical end, valve section 322 closes into the internal edge 324 of the first-colored extrusion opening 232 of each of the extrusion ports. Accordingly, by adjusting each needle valve individually, the respective flow of pressurized first-colored aerated confection blend through each individual extrusion port may be readily adjusted during operation of the extrusion apparatus. The valve may also be used to close off one or more selected ports if appropriate to provide a desired product mix.

Figure 4:
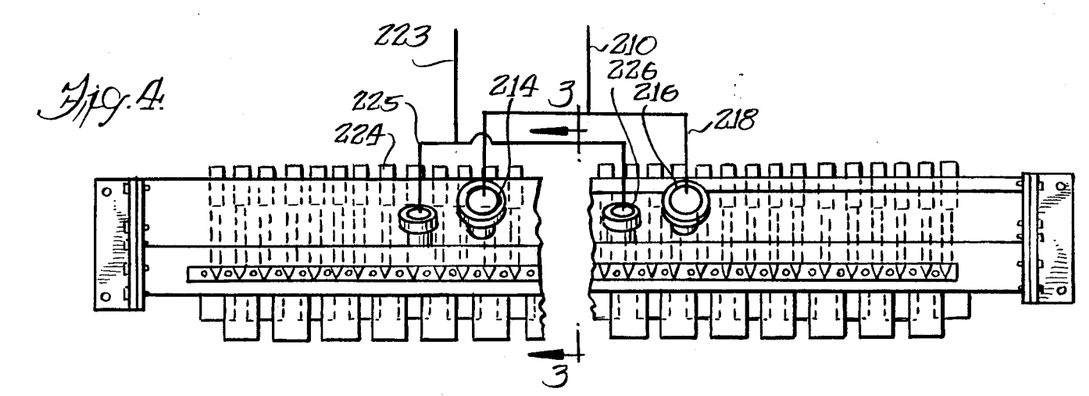
FIG. 4 is a top view of the compound extrusion apparatus of FIG. 2.
Figures 7, 8:
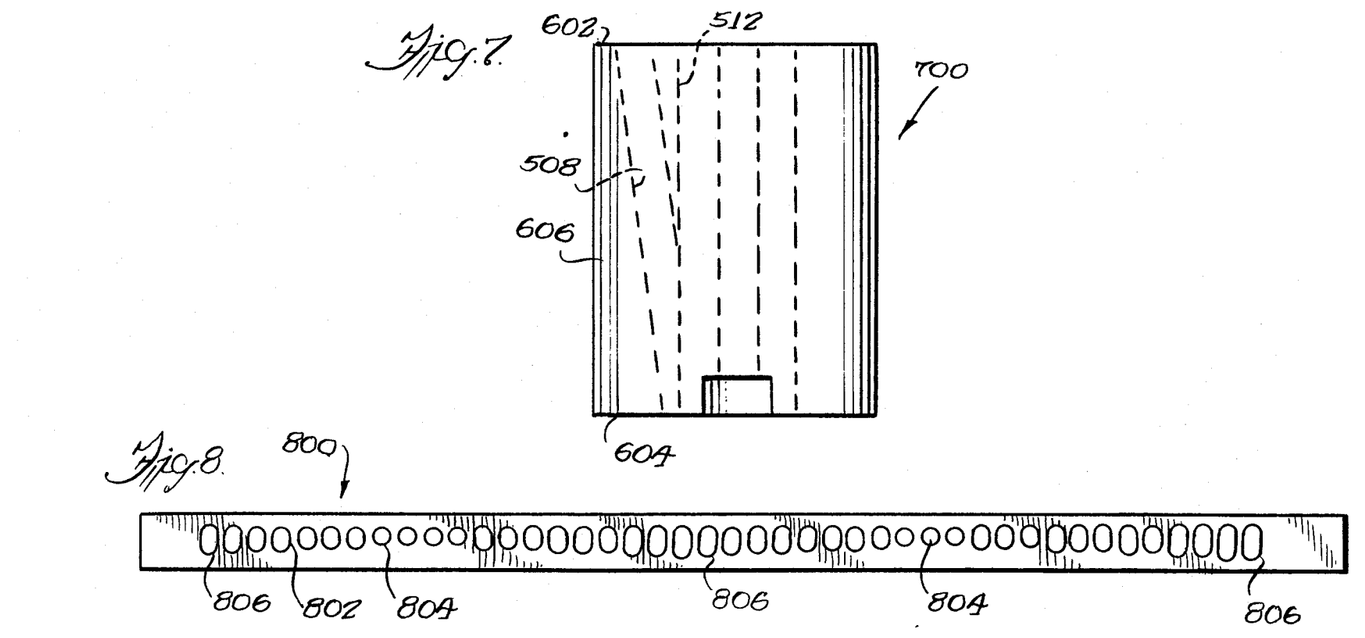
FIG. 7 is a top view of one of the upper compound extrusion nozzles of the multi-orifice extrusion apparatus of FIG. 2.
FIG. 8 is a front view of an internal diffusion plate of a first-colored aerated confection chamber of the compound extrusion apparatus of FIG. 2.

As also shown in FIG. 3, it will be seen that the second-colored aerated confection reservoir zone 220 of the extruder apparatus 200 comprises an elongated pressurized aerated confection distribution zone 352 defined by upper wall 354, rear support wall 356 and variable diffuser plate 800, which is shown in more detail in FIG. 8. The second-colored aerated confection extrusion reservoir zone 220 comprises an extrusion port distribution zone 360 similarly extending the length of the extrusion apparatus 200, which is in turn defined by the distribution plate 800, lower wall 362, front wall 363 and extrusion face 206. As shown in FIG. 8, the diffusion plate 800 is substantially rectangular in shape, and is provided with a plurality of openings 802 which, in a manner similar to those of plate 900, are centered upon the second-colored confection extrusion zone outlets 240. The openings 802 similarly vary in size along the length of the plate 800, with smaller openings 804 at positions adjacent the second-colored confection inlet ports 224, 226, and with the largest openings 806 positioned at locations most distant from the inlet ports 224, 226. The minimum dimension of the smallest opening 804 is larger than the outer diameter of valve stems 372 to permit passage of the second-colored aerated, pressurized confection blend through the zone between the respective valve stem and the plate openings. As shown in FIGS. 2, 3 and 4, the second-colored confection reservoir 220 is also provided with needle valve assemblies 370 for each of the second-colored extrusion zone outlets 240. Each of the needle valve assemblies 370 extends from the extrusion zone outlets of the second-colored confection extrusion reservoir 220. The outer, stationary valve element forms a pressure tight seal with the wall 354, like that of valve elements 318 in wall 306. Upon rotational adjustment of each of the needle valve assemblies 370, its conical and valve section 372 opens from or closes into the internal edge of each of the respective second-colored extrusion zone outlets 240 (FIG. 2). Accordingly, by adjusting its associated needle valve, the respective flow of the second-colored confection blend through each individual extrusion outlet zone may be readily adjusted. To achieve proper compound extrusion, typically the extrusion pressure for smaller cross sectional area colored zones of the aerated multicolored confection product will be higher than the extrusion pressure for differently colored zones of larger cross section. The provision of the diffusion plate and needle valve system provides for such adjustment of flow and extrusion pressure at each port to achieve proper extrusion of the multicolored strands.

As shown in FIG. 2, each extrusion port 230 has a discharge zone 232 for the first-colored confection blend, and a discharge zone 234 for the second-colored confection blend. These differently colored blends are combined in rows of individual extrusion nozzles 500, 700 which are respectively illustrated in more detail in FIGS. 5, 6 and 7.

Figure 6:
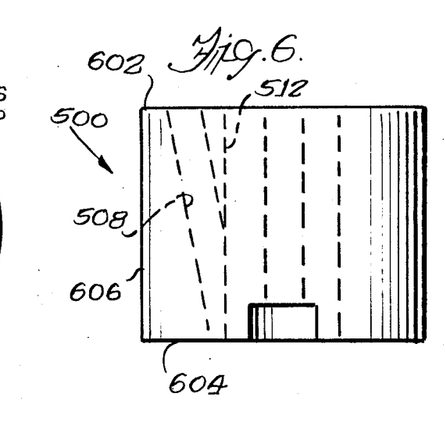
FIG. 6 is a top view of the extrusion nozzle assembly of FIG. 5.

With reference to the lower row of nozzles 500, as shown in FIGS. 5 and 6, the nozzles 500 are provided with a proximate confection receiving face 602 which is adapted to connect with the discharge zones 232, and a distal extrusion face 604 from which the multi-colored confection strands are discharged. The nozzle body 606 of the illustrated embodiment has two internal channels 508, 510 which are positioned and oriented at the proximate confection-receiving face 602 so that they communicate with the respective second-colored confection discharge openings 234 of the extrusion ports 230. Similarly, the illustrated nozzle body 500 has a channel 512 which is larger in cross-sectional area than the sum of the cross sectional areas of the channels 508, 510 which is positioned at the proximate confection receiving face 602 so that it communicates with the first-colored discharge opening 232 of its respective extrusion port 230. The channel 512 is generally cylindrical, but is shaped at the discharge face 604 by a wedge-shaped solid insert zone 514 which provides a "pie-shape" to the extruded confection issuing therefrom.

The first-colored confection channel 512 and the second-colored confection channels 508, 510 merge within the body 606 of the nozzle elements 500 so that the respective confection blends transported therethrough are combined into a single strand prior to extrusion from the extrusion face 604. In this regard, it is believed to be important that the velocity of the differently-colored extrusion blends through the channels are substantially equal at the point of merger within the nozzle. If one of the confection streams within the nozzle substantially exceeds one or more of the other streams, the interface between the differently colored portions of the resulting multicolored strand is distorted or degraded, rather than abrupt and uniform. By "substantially equal" is meant that the velocity of all streams are within the range of from about 1.05 to about 0.95 times the velocity of the slowest stream at the point of merger of the streams.

The upper nozzles 700 are slightly longer than the nozzles 500, but are otherwise similar. Accordingly, the strands produced by the lower nozzles may be coated with an anti-sticking agent such as powdered starch prior to any possible contact with the upper strands. In this manner, a dense assembly of strands may be provided on the belt 130 for cutting.

It will be appreciated that by adjustment of the respective needle valves, the extrusion velocities of the differently colored confection channels may be adjusted to provide a composite strand of desired cross-section profile having a sharp, well defined interface between the differently colored zones.

In the illustrated nozzle embodiment 500, the first-colored confection may be white and the second-colored confection may be red-colored, to provide "Ms PAC-MAN" (trademark of Bally Corporation) shaped confection pieces after cross sectional severing of the strands produced by the nozzles. Many other multicolored designs many be incorporated into nozzle structures and utilized with the apparatus.

The nozzles 500 are further provided with cylindrical bores 502, 504 for fastening the nozzles to the respective extrusion zones by means of appropriate bolts so that the nozzles may be removed for cleaning and maintenance of the apparatus, and so that other nozzles having different extrusion shapes may be utilized if desired.

Accordingly, it will be appreciated that the present invention provides methods and apparatus for manufacturing multicolored confection pieces of high quality and uniformity. While the invention has been described with reference to a specific embodiment, it will also be appreciated that various alterations and modifications will be apparent from the present disclosure and are considered to be within the scope of the following claims.

WHAT IS CLAIMED IS:

1. A multi-orifice compound extrusion apparatus for extruding multicolored aerated confection strands comprising
   confection pumping means for providing a first-colored pressurized, fluid, aerated confection blend of a first color at a temperature of at least about 120° F. and at a pressure in the range of at least about 30 psi, and for providing a second-colored pressurized, fluid, aerated confection blend of a second color different from said first color, at a temperature in the range of at least about 120° F. and at a pressure of at least about 30 psi,
   first elongated diffusion chamber means for receiving said first-colored aerated, pressurized confection blend and for distributing said first-colored confection blend received therein along a first diffusion chamber zone having a width to length ratio of at least about 10,
   first elongated extrusion chamber means for receiving said first-colored confection blend from said first elongated diffusion chamber means and for discharging said first-colored confection blend through a plurality of at least 10 separated extrusion ports,
   a first elongated diffusion means positioned between said first elongated diffusion chamber means and said first elongated extrusion chamber means comprising a first elongated barrier sheet extending along the width of said first diffusion chamber means having one or more passageways therethrough of cross-sectional area along the length of said first barrier sheet varying as an inverse function of the pressure of the confection blend in said first diffusion chamber zone adjacent said first barrier sheet, for transmitting and equalizing the pressure distribution of said first-colored confection blend from said first elongated diffusion chamber means to said first elongated extrusion chamber means along the width of said first extrusion chamber means,
   second elongated diffusion chamber means for receiving said second-colored aerated, pressured confection blend and distributing said second-colored confection blend received therein along a second diffusion chamber zone having a width to length ratio of at least about 10,
   second elongated extrusion chamber means for receiving second-colored confection blend from said second elongated diffusion chamber means and for discharging said second-colored confection blend through each of said plurality of at least 10 separate extrusion ports separately from said first-colored confection blend,
   a second elongated diffusion means positioned between said second elongated diffusion chamber means and said second elongated extrusion chamber means comprising a second elongated barrier sheet extending along the width of said second diffusion chamber means having one or more passageways therethrough of cross-sectional area along the length of said second barrier sheet varying as an inverse function of the pressure of the confection blend in said second diffusion chamber zone adjacent said second barrier sheet, for transmitting and equalizing the pressure distribution of said second-colored confection blend from said second elongated diffusion chamber means to said second elongated extrusion chamber means along the width of said second extrusion chamber means,
   a plurality of at least 10 compound extrusion nozzles each positioned adjacent to one of said separate extrusion ports for receiving a stream of said first-colored confection blend and a stream of said second-colored confection blend discharged through each said port, for combining and forming said first-colored stream and said second-colored stream in each said nozzle into a single, multi-colored strand of predetermined cross-sectional shape without substantial blending of said first-colored and said second-colored streams, to provide a plurality of at least 10 multi-colored confection strands, first-colored extrusion port valve means for individually adjusting the rate of flow of said first-colored aerated confection stream from said first elongated extrusion chamber through each said port, and second-colored extrusion port valve means for individually adjusting the rate of flow of said second-colored aerated confection stream from said second elongated extrusion chamber through each said port to permit individual adjustment of the flow rate of each of the first-colored and the second-colored confection blend components of each of said plurality of confection strands.

2. A multi-orifice compound extrusion apparatus in accordance with claim 1 wherein said confection pumping means provides said first and second confection blends at a pressure in the range of from about 30 to about 100 psi and at a temperature in the range of from about 120° F. to about 135° F.

3. Apparatus in accordance with claim 1 wherein said first diffusion chamber zone has a width to length ratio of at least about 20, wherein said first extrusion chamber means has at least 30 separate extrusion ports, and wherein said apparatus has at least 30 of said compound extrusion nozzles each positioned adjacent one of said separate extrusion ports for extruding a multi-colored confection strand.

4. Apparatus in accordance with claim 1 wherein said confection pumping means for providing said first and second confection streams comprises a confection pump, a confection aerator, a conduit manifold dividing the confection aerator output into a plurality of at least two aerated confection stream conduits respectively connected to said first diffusion chamber means and said second diffusion chamber means, and at least one mixer in at least one of said plurality of confection output conduits for mixing a coloring agent in a confection stream conducted therethrough.

5. Apparatus in accordance with claim 1 wherein said first-colored extrusion port valve means comprises a plurality of individually adjustable needle valves each individually controlling the flow of first-colored confection stream through one of said extrusion ports, and wherein said second colored extrusion port valve means comprises a plurality of needle valves each individually controlling the flow of second-colored confection stream through one of said extrusion ports.

6. A multi-orifice compound extrusion apparatus for extruding multicolored aerated confection strands comprising confection pumping means for providing a first-colored pressurized, fluid, aerated confection blend of a first color at a temperature from about 115° F. to about 160° F. and at a pressure of at least about 30 psi, and for providing a second-colored pressurized, fluid, aerated confection blend of a second color different from said first color, at a temperature in the range of from about 115° F. to about 160° F. and at a pressure of at least about 30 psi, first elongated diffusion chamber means for receiving said first-colored aerated, pressurized confection blend and for distributing said first-colored blend along a first diffusion chamber zone having a width to length ratio of at least about 10, first elongated extrusion chamber means for receiving said first-colored confection blend from said first elongated diffusion chamber means and for discharging said first-colored confection blend through a plurality of at least 10 separate extrusion ports, a first elongated diffusion means positioned between said first diffusion chamber means and said first elongated extrusion chamber means comprising a first elongated barrier sheet extending along the width of said first diffusion chamber means having one or more passageways therethrough of cross-sectional area along the length of said first barrier sheet varying as an inverse function of the pressure of the confection blend in said first diffusion chamber zone adjacent said first barrier sheet, for transmitting and equalizing the pressure distribution of said first-colored confection blend from said first elongated diffusion chamber means to said first elongated extrusion chamber means along the width of said second elongated extrusion chamber means, second elongated diffusion chamber means for receiving said second-colored aerated, pressurized confection blend and distributing said second-colored blend received therein along a second diffusion chamber zone having a width to length ratio of at least about 10, second elongated extrusion chamber means for receiving said second-colored confection blend from said second elongated diffusion chamber means for discharging said second-colored confection blend through each of said plurality of at least 10 separated extrusion ports, a second elongated diffusion means positioned between said second diffusion chamber means and said second extrusion chamber means comprising a second elongated barrier sheet extending along the width of said second diffusion chamber means having one or more passageways therethrough of cross-sectional area along the length of said second barrier sheet varying as an inverse function of the pressure of the confection blend in said second diffusion chamber zone adjacent said second barrier sheet, for transmitting and equalizing the pressure distribution of the second-colored confection blend from said second elongated diffusion chamber means to said second elongated extrusion chamber means along the width of said second elongated extrusion chamber means, a plurality of at least 10 compound extrusion nozzles each positioned adjacent to one of said separate extrusion ports for receiving a stream of said first-colored confection blend and a stream of said second-colored confection blend discharged through each said port, for respectively combining and forming said first-colored stream and said second-colored stream into a plurality of single, multi-colored strands of predetermined cross-sectional shape without substantial blending of said first-colored and said second-colored streams, first-colored extrusion port valve means for individually adjusting the rate of flow of the first-colored aerated confection through each said port comprising a plurality of individually adjustable needle valves each individually controlling the flow of said first-colored confection stream through one of said extrusion ports, and second-colored extrusion port valve means for individually adjusting the rate of flow of said second-colored aerated confection product from said second extrusion chamber through each said port comprising a plurality of individually adjustable needle valves each individually controlling the flow of second-colored confection stream.

7. Apparatus in accordance with claim 6 wherein said confection pumping means for providing said first and second confection streams comprises a confection pump, a confection aerator, a conduit manifold dividing the confection aerator output into a plurality of at least two aerated confection stream conduits respectively connected to said first diffusion chamber means and said second diffusion chamber means, and at least one miser in at least one of said plurality of confection output conduits for mixing a coloring agent in a confection stream conducted therethrough.

* * * * *

UNITED STATES PATENT AND TRADEMARK OFFICE
CERTIFICATE OF CORRECTION

PATENT NO. : 4,925,380

DATED : May 15, 1990

INVENTOR(S) : Robert J. Meisner

It is certified that error appears in the above-identified patent and that said Letters Patent is hereby corrected as shown below:

On the title page, under the title, "References Cited - U.S. Patent Documents", change "Blair et al." to read --Blain et al.--.

In Column 7, line 23, after the word "powered" (second occurrence), delete the comma --,--.

In Column 8, lines 22-23, after the word "orifice", delete the word --compound--.

In Column 9, line 53, after the word "end" delete --,.--.

IN THE CLAIMS:

In Column 12, line 32, change "pressured" to read the word --pressurized--.

In Column 14, line 32, after the word "means" insert the word --and--.

In Column 14, lines 33-34, change "separated" to read the word --separate--.

In Column 16, line 5, change "miser" to read the word --mixer--.

Signed and Sealed this

Thirty-first Day of March, 1992

Attest:

HARRY F. MANBECK, JR.

*Attesting Officer*  *Commissioner of Patents and Trademarks*